US 8,706,341 B2

(12) United States Patent
Madsen et al.

(10) Patent No.: US 8,706,341 B2
(45) Date of Patent: Apr. 22, 2014

(54) METHOD OF DETECTING A STRUCTURE IN A FIELD, A METHOD OF STEERING AN AGRICULTURAL VEHICLE AND AN AGRICULTURAL VEHICLE

(75) Inventors: Tommy Ertbolle Madsen, Virum (DK); Morten Rufus Blas, Copenhagen (DK); Mogens Blanke, Farum (DK)

(73) Assignee: CLAAS Agrosystems KGaA mbH & Co. KG, Guetersloh (DE)

( * ) Notice: Subject to any disclaimer, the term of this patent is extended or adjusted under 35 U.S.C. 154(b) by 151 days.

(21) Appl. No.: 13/052,678

(22) Filed: Mar. 21, 2011

(65) Prior Publication Data
US 2012/0072068 A1 Mar. 22, 2012

(30) Foreign Application Priority Data
Mar. 23, 2010 (EP) .................................... 10157313

(51) Int. Cl.
*G01C 11/00* (2006.01)
(52) U.S. Cl.
USPC .............. 701/28; 701/50; 56/10.2 A; 382/104
(58) Field of Classification Search
USPC ................ 701/23, 28, 50; 56/10.2 A, 10.2 R; 382/103, 104, 108
See application file for complete search history.

(56) References Cited

U.S. PATENT DOCUMENTS

| | | | | |
|---|---|---|---|---|
| 6,336,051 B1* | 1/2002 | Pangels et al. ................... 700/50 |
| 6,389,785 B1* | 5/2002 | Diekhans et al. ........... 56/10.2 F |
| 7,400,957 B2* | 7/2008 | Hofer et al. ...................... 701/41 |
| 8,185,275 B2* | 5/2012 | Han et al. .......................... 701/50 |
| 8,200,399 B2* | 6/2012 | Madsen ............................ 701/50 |
| 2002/0012002 A1* | 1/2002 | Ito ................................... 345/552 |
| 2005/0102079 A1* | 5/2005 | Hofer et al. ...................... 701/41 |
| 2006/0047418 A1* | 3/2006 | Metzler et al. ................. 701/207 |
| 2006/0153459 A1* | 7/2006 | Zhang et al. ................... 382/224 |
| 2007/0005208 A1* | 1/2007 | Han et al. .......................... 701/50 |
| 2009/0037059 A1* | 2/2009 | Huster et al. .................... 701/50 |
| 2009/0168875 A1* | 7/2009 | Park et al. ................. 375/240.12 |
| 2010/0063690 A1* | 3/2010 | Madsen .......................... 701/50 |

FOREIGN PATENT DOCUMENTS

| | | |
|---|---|---|
| EP | 0 887 660 | 12/1998 |
| EP | 1 529 428 | 5/2005 |
| EP | 1 738 630 | 1/2007 |
| EP | 2 020 168 | 2/2009 |
| JP | 2006023242 A * | 1/2006 |
| WO | 2007/031093 | 3/2007 |

* cited by examiner

*Primary Examiner* — Thomas Black
*Assistant Examiner* — Ce Li
(74) *Attorney, Agent, or Firm* — Michael J. Striker (57) ABSTRACT

An agricultural vehicle has a steering system providing steering signals and including an imaging device for imaging surroundings of the vehicle and an image processing device, the steering system operates to provide by the imaging device an image of the field, analyze the image to obtain texture information, assign to a plurality of areas of the image probability-values reflecting the likelihood that the respective area relates to a specific structure, assume at least one geometric property of the specific structure, and establish a most possible position parameter of the specific structure taking into account the probability-values and the assumed geometric property; and to provide a steering signal in accordance with the position parameter thus established.

15 Claims, 5 Drawing Sheets

METHOD OF DETECTING A STRUCTURE IN A FIELD, A METHOD OF STEERING AN AGRICULTURAL VEHICLE AND AN AGRICULTURAL VEHICLE

CROSS-REFERENCE TO RELATED APPLICATION

The invention described and claimed hereinbelow is also described in German Patent Application DE 10 157 313.7 filed on Mar. 23, 2010. This German Patent Application, whose subject matter is incorporated here by reference, provides the basis for a claim of priority of invention under 35 U.S.C. 119(a)-(d).

BACKGROUND OF THE INVENTION

The present invention relates to a method of detecting a structure in a field, said method comprising: providing an image of the field, analysing the image to obtain texture information, assigning to a plurality of areas of the image probability-values reflecting the likelihood that the respective area relates to a specific structure. Further the present invention relates to a method of steering an agricultural vehicle or implement in relation to a structure in a field, and to an agricultural vehicle comprising a steering system providing steering signals, said steering system comprising an imaging device for imaging surroundings of the vehicle and an image processing device.

Within agriculture many processes are performed on a field whereby an implement is driven in the field back and forth or around and around to cover the entire field, e.g. when ploughing, sowing or drilling, harvesting and collecting crops. In many of these processes a track is followed, said track being provided by different areas of the field exhibiting different structure with different visual texture. The different structures may e.g. be ploughed and unploughed soil, sown and non-sown areas, drilled rows and a harrowed seedbed, standing crop and lying crop or harvested ground, swaths of cut crop and harvested ground, etc.

It is a wish to be able to automate the steering of the implement and the vehicle carrying or towing the implement, and many methods are being explored for identifying tracks to be follow, like the tracks mentioned above. Such methods include methods using laser scanners, photogrammetry, etc. These methods may be combined with other methods for navigating an agricultural vehicle, such as methods based on GPS, odometry, etc.

Methods using photogrammetry include methods using stereo-photogrammetry e.g. for detecting a three-dimensional structure on the field. Such structure could be a swath of harvested crop lying on the field to be pick-up e.g. by a baler. Such stereo-photogrammetry method is e.g. known from WO-A-2007/031093, which relates to a method of controlling a baler based on 3D imaging technology.

Alternative or supplementary to stereo-photogrammetry an image of the field may be analysed to distinguish the different structures e.g. by their (visual) texture. By texture should be understood local variations due to differenced in colour, structure, such as straws standing or lying, being long or short, soil broken into smaller or larger lumps, etc.

Examples of methods using analysis of texture for distinguishing structures in an agricultural field are known, e.g.:

U.S. Pat. No. 6,336,051 discloses tracking a crop line between cut and uncut crop in a field or between a processed and an unprocessed surface of the field by analysing an image of the field by scanning the pixels of a part of the image line by line and assigning by means of a colour or a texture discriminator a value to the respective pixels. For each line a step function is fitted to determine the position of the crop line, where by a binary signal is outputted. For each line the step function thus established is compared to a predetermined step function and if the established step function is outside limits the line is labelled "after end of row", otherwise the line is labelled "before end of row", By counting from the top of the image an end-of-row position is established. Further a combined probability density function for processed and unprocessed surface is provided and for regions of 10×10 pixels the probability of the region belonging to the processed or unprocessed surface of the field is calculated. If the probability falls below a threshold value the region is assumed to represent an obstacle.

U.S. Pat. No. 7,400,957 discloses a method of detecting a structure in a field as mentioned above in the opening paragraph. More specifically it discloses detection of a swath of cut crop lying on a field by analysing an image, whereby pixel by pixel of the image is appointed a likelihood value based on the surrounding texture, the pixels are appointed the value swath or not swath according to a threshold value for the likelihood, thus providing a binary information whether the particular pixels are to be assigned to the swath of cut crop or not. The binary image thus provided is treated to reduce noise and the position and axes of inertia of the swath are established as a basis for providing a steering signal for a vehicle carrying the camera providing the image.

SUMMARY OF THE INVENTION

It is the object of the present invention to provide an improved method using texture information in an image for detecting a structure in a field.

It is a further object to provide a method of steering an agricultural vehicle or an agricultural implement carried or towed by the vehicle using the improved method using texture information.

It is a further object to provide an agricultural vehicle comprising a steering system providing steering signals using the improved method using texture information.

In a first aspect the object is fulfilled according to the invention by a method of detecting a structure in a field, said method being characterized by assuming at least one geometric property of said specific structure, and establishing a most possible position parameter of said specific structure taking into account said probability-values and the assumed geometric property. Hereby is obtained that a loss of information due to binarisation is avoided and that a position parameter of the specific structure may be established even if the signal is weak or poor.

The image is preferably provided in a computer readable form such as a pixel data file and each area of the plurality of areas of the image may be a group of pixels or preferably a single pixel. The plurality of areas may e.g. be every pixel of the image or a number of mutually spaced pixels of the image.

Working in a field it will usually be obvious what kind of structure will be detected and accordingly the kind of geometric property may be selected. Thus the at least one geometric property is preferably selected from a group comprising a borderline, a centreline, a width, a position and an attitude. When e.g. ploughing a field a borderline between newly ploughed soil and not yet ploughed soil will be present, and when harvesting a field a borderline between harvested and not yet harvested field surface will be present. When e.g. collecting and baling swaths of previously mowed material such swaths will have a centreline and a width and they will exhibit a position or off-set relative to the current track of the vehicle used for processing the field and the direction of extension of the centreline will have an attitude or angle relative to the current track or direction of heading of the vehicle used for processing the field.

Preferably the plurality of areas is assigned probability-values reflecting the likelihood that the respective areas relate to a structure different from said specific structure. Hereby is obtained an improved detection of the specific structure as the probability that respective areas do not relate to the specific structure is evaluated. Hereby the probability-values may be relative values i.e. values reflecting the probability that a given area relates to the specific structure compared to the probability that the given area relates to another structure than said specific structure.

Having established a most possible position parameter, e.g. the position and attitude of a borderline or of a centre line the method preferably comprises establishing a probability-value reflecting the likelihood of said specific structure being present in the image. Such probability-value may be used to evaluate the reliability of the detection, which in turn may be used for selecting a steering strategy in case of more navigation sensors being provided.

Prior to the step of analysing the image to obtain texture information preferably a learning or training step is performed to obtain information about texture of said structure in the field and information about texture of the field beside said structure. This learning step may be performed once for the kind of field to be processed and kind of structure expected to be found, but preferably it is performed from time to time while processing the field in question.

The learning step may be performed by providing an image of the field, determining areas of the image showing the structure and areas of the image showing the field beside the structure, and analysing the respective areas of the picture to obtain texture information relating to the structure and the field beside the structure, respectively.

Preferably an upper part and a lower part of the image are analysed individually when obtaining texture information. This is due to the fact that usually the part of the field shown in the upper part of the picture will be further away from the imaging device than the part of the field shown in the lower part of the image. This difference of distance entails a difference of visual texture due to the perspective of the image though similar structure is shown in the upper and lower part of the image. Preferably the image is thus divided into two parts i.e. an upper and a lower part, but alternatively the image may be divided into three, four or even more parts showing parts of the field in different ranges of distance.

According to a second aspect of the invention a method of steering an agricultural vehicle or implement in relation to a structure in a field, is characterized by detecting the structure by a method comprising: providing an image of the field, analysing the image to obtain texture information, assigning to a plurality of areas of the image probability-values reflecting the likelihood that the respective area relates to a specific structure, assuming at least one geometric property of said specific structure, and establishing a most possible position parameter of said specific structure taking into account said probability-values and the assumed geometric property; and providing a steering signal in accordance with the position parameter thus established. Hereby the advantages mentioned above in relation to the first aspect are correspondingly obtained.

According to a third aspect of the invention an agricultural vehicle comprising a steering system providing steering signals, said steering system comprising an imaging device for imaging surroundings of the vehicle and an image processing device, said steering system operating to provide by means of the imaging device an image of the field, analyse the image to obtain texture information, assign to a plurality of areas of the image probability-values reflecting the likelihood that the respective area relates to a specific structure, assume at least one geometric property of said specific structure, and establish a most possible position parameter of said specific structure taking into account said probability-values and the assumed geometric property; and to provide a steering signal in accordance with the position parameter thus established. Hereby the advantages mentioned above in relation to the first aspect are correspondingly obtained.

Preferably the steering system comprises at least one additional navigation sensor, and the steering system preferably operates taking into account an output of said additional navigation sensor when providing a steering signal. The at least one additional navigation sensor is preferably selected from a group comprising a GPS-sensor, an optical field contour sensor, an inertial measuring unit and an odometry sensor. An optical field contour sensor could e.g. comprise a laser scanning device or a 3D-imaging device such as in stereo camera. An odometry sensor could e.g. comprise wheel odometry sensors or a visual odometry sensor sensing the movement of the vehicle relative to the surroundings by image analysis as disclosed in EP application No. 08 158 693.5 (not yet published).

In an embodiment in which the steering system is adapted to establish a probability-value reflecting the likelihood of a specific structure being present in a image once a most possible position parameter of such structure has been established, e.g. the position and attitude of borderline or of a centre line the method preferably, such probability-value is preferably used to evaluate the reliability of the detection, which in turn is used for selecting a steering strategy in case of more navigation sensors being provided. The principle of such selection of a steering strategy or a sensor signal processing algorithm is disclosed e.g. in EP 2 020 168 A1.

BRIEF DESCRIPTION OF THE DRAWINGS

In the following the invention will be explained in further detail by way of examples in relation to tracking a swath in a field with reference to the accompanying drawings, in which.

DESCRIPTION OF THE PREFERRED EMBODIMENTS

Figure 1:
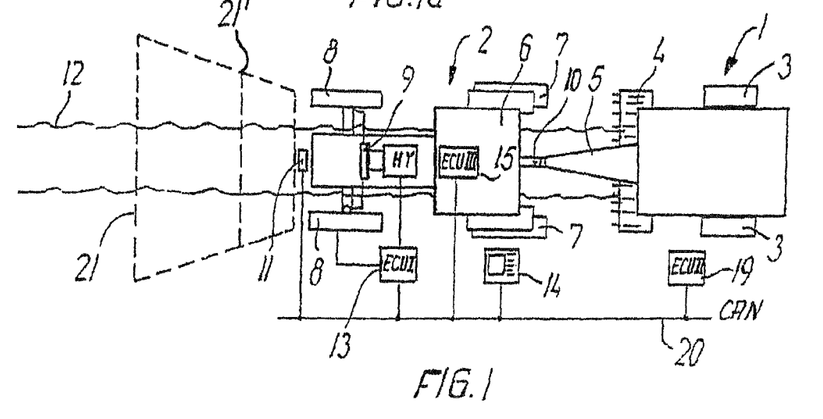
FIG. 1 shows a top view of a tractor and a baler hitched thereto.
Figure 2:
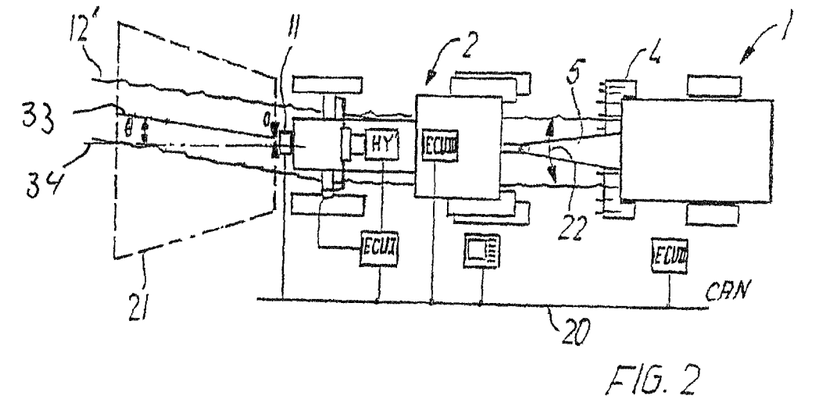
FIG. 2 shows a top view of the tractor of FIG. 1 in another situation.

FIGS. 1 and 2 show a baler 1 coupled to a towing tractor 2. The baler 1 has wheels 3, a pick-up 4, a tongue 5 and a compression chamber not shown in detail. The tractor 2 has an operator's cab 6, rear wheels 7, front wheels 8 turnable by means of a hydraulic cylinder 9, and a coupling device 10 for fastening of the tongue 5 of the baler. At the very front of the tractor, an imaging device 11 is mounted. The imaging device 11 e.g. comprises a stereo camera with a signal processor for providing 3D images and colour images.

The imaging device 11 records images of a crop string 12 of hay/straw/grass, i.e. a swath or a windrow, in front of the tractor, which is to be picked up by the baler.

Figure 4:
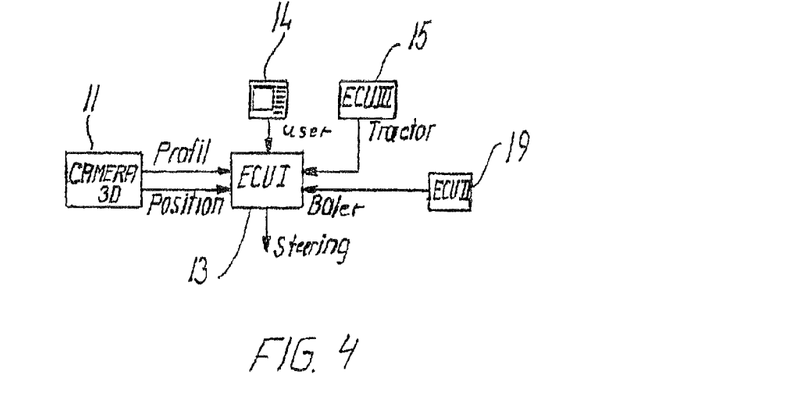
FIG. 4 illustrates an embodiment of a control system of the tractor of FIG. 1, and FIGS. 5a and 5b normalized average texton histograms.

The tractor 2 is equipped with electro-hydraulic control with a processor 13, the hydraulic cylinder 9 and a terminal 14 with a monitor for communication with the user. The tractor has another processor 15 for controlling and monitoring various functions in the tractor, such as safety functions, and sensors for, for example, speed measurement and wheel position measurement and global positioning using GPS signals.

The baler 1 is equipped with a processor 19 monitoring its functions.

All sensors, processors or ECU's (electronic control units) 3, 15, 19 and imaging device 11 are directly or indirectly connected via a CAN network 20 for communication between such units.

Figure 1A:
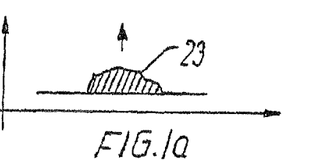
FIG. 1a shows a cross-section of a swath shown in FIG. 1.
Figure 1B:
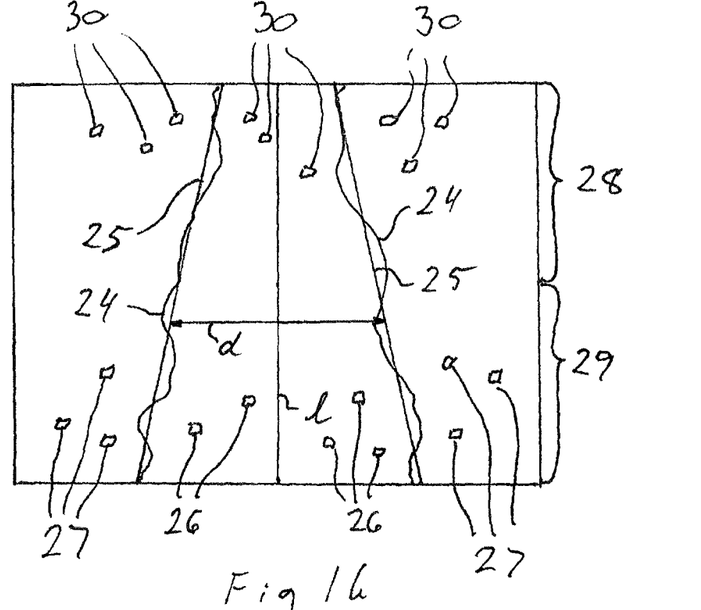
FIG. 1b shows an image provided by a camera of the tractor in FIG. 1.

In order to be able to control the tractor 2 and the baler 1 for optimal pick up of the crop string 12 it is important to establish the position of the crop string 12. This may be done by means of a 3D imaging device such as a stereo camera as disclosed in WO-A-2007/031093, which is also mentioned in the opening part of the present description. To this end the imaging device 11 comprises a stereo camera and images an area 21 of the field in front of the tractor 2. From the image thus taken the profile 23 of the field and the crop string 12 lying thereon may be established for a section 21' as shown in FIG. 1a. Establishing the profile 23 for successive sections from nearest the tractor 2 to farthest away the outlines 24 of the crop string 12 in the image may is established as shown in FIG. 1b. Having established the outlines 24 mutually parallel mean-outlines 25 may be calculated together with a mean width d of the crop string 12 and a mean centre line l thereof. The establishment of the profile 23 of the crop string 12 is most reliable in the range of the image near the tractor 2. Thus the range in front of the tractor, in which a reliable indication of the position of the crop string is obtainable, is limited.

In order to provide further information about the position of the crop string 12 and to be able to establish a more reliable estimate in a further range, the crop string is identified according to the present invention also by means of texture analysis.

Thus the imaging device 11, apart from the stereo image, provides an image with colour information, which is analysed, as will be explained in more detail below.

To be able to identify the crop string and to distinguish it from the field adjacent the crop sting the control system must have information about the texture of these different parts. In the present embodiment this is obtained by performing a learning or training step, by which a plurality of areas 26 (FIG. 1b) or image patches of the part of an image (training image) depicting the crop string 12 are analyses to provide texture information, and a plurality of areas 27 or image patches of the part of the image depicting the field adjacent or beside the crop string are analysed to provide texture information.

Due to the effect of perspective similar items will show different texture when viewed at a distance than when viewed at close range. Therefore the upper and the lower half 28, 29 or section of the image are preferably processed separately with regard to the analysis for texture information. In other embodiments the image may be divided in this way into more sections than two.

Figure 3:
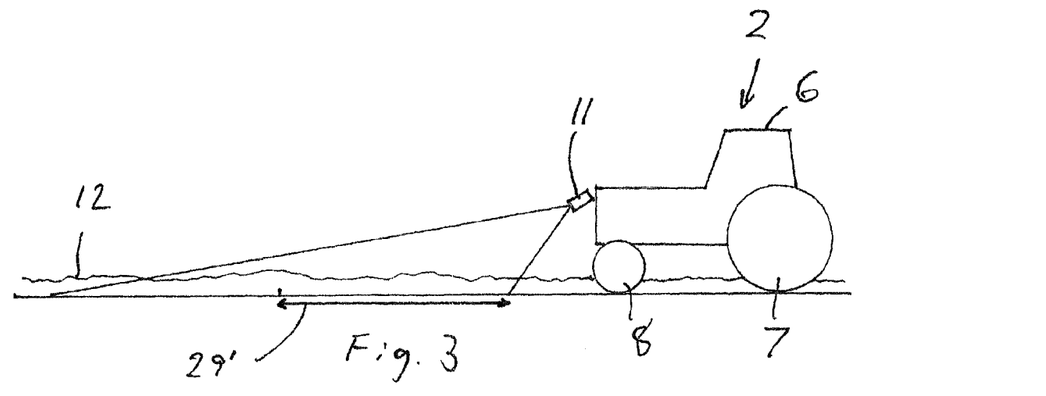
FIG. 3 shows a side view of the tractor of FIG. 1 omitting the baler.

As basis for a learning step an image like the one shown in FIG. 1b, which at least for the range close to the tractor, i.e. the lower half 29 of the image, provides a reliable outline 24 of the crop string, may be used. For the range far from the tractor, i.e. the upper part 28 of the image of FIG. 1b, texture information of the respective areas 30 may be captured while the areas are in the upper part 28 of the image, and from a subsequent image it may be determined which of the areas 30 belong to the crop string 12 and which of the areas 30 belong to the field beside the crop string. Such subsequent image will be taken at a time when the tractor 2 has advanced a distance 29' (FIG. 3) corresponding to the height of the lower half 29 of the image. It should be understood that techniques for tracking positions of points or areas from one picture to another picture, which is partly overlapping the first picture, are available to the skilled person.

Figure 2A:
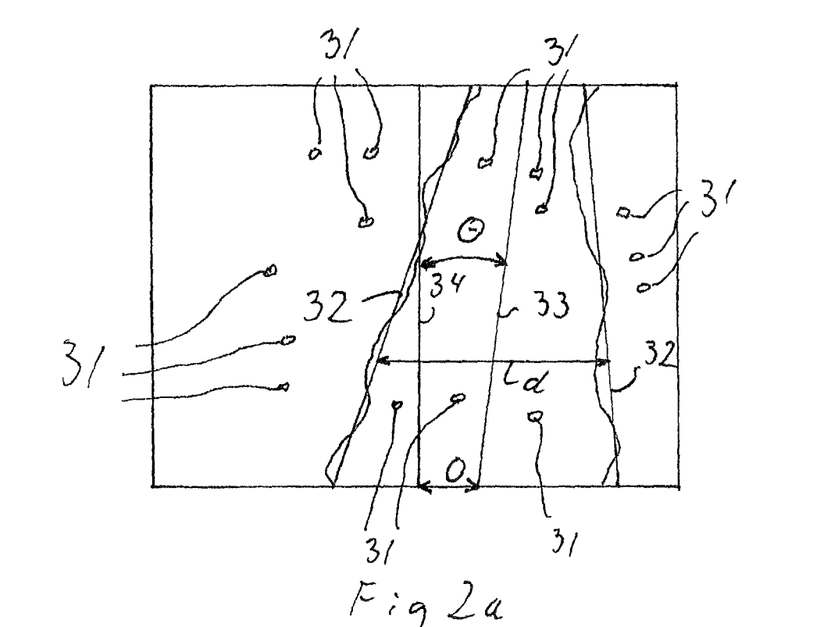
FIG. 2a shows an image provided by a camera of the tractor in FIG. 2.

Having thus obtained texture information about different areas belonging to a structure in the field, i.e. the crop string, and about different areas not belonging to the structure, respectively, and at different distances, it is now possible to take a picture, i.e. to provide an image of the crop string 12' in the field as shown in FIG. 2a, analyse a plurality of areas 31 of the image and provide for the respective areas a probability value whether they depict the crop string 12' or the field beside the crop string.

It should be understood that though a few distinct areas 31 or image patches are shown in FIG. 2a, a large number of such areas 31 might be analysed and even overlapping areas. Thus an area centred round every single pixel of an image may be analysed, and preferably is.

Assuming now that the crop string 12' has a width d as determined in relation to the analysis of the image shown in FIG. 1b, the most probable position of outlines 32 of the crop string 12' are established following which an offset O and an angle or attitude Θ of a centre line 33 of the crop string 12' relative to a centre line 34 of the tractor 2 may be established.

The offset O and the attitude Θ may be used for establishing the need for a steering correction for the tractor 2 or the baler 1 and accordingly for the provision of a steering signal.

Since probability values are provided for the respective areas of the image, from which the offset O and the attitude Θ are established, it is possible to evaluate the reliability of the signal, i.e. the values of the offset O and the attitude Θ, provided. This evaluation may be used for determining how to depend on the signal of the texture analysis e.g. in case of signals from more navigation sensors, such as the signal from the stereo camera, being present.

In more details the analysis outlined above may be carried out as follows.

The image shown in FIG. 1b is in the present embodiment an image comprising pixels each defining a three dimensional colour vector $(L_c, a_c, b_c)$ where L is intensity and a and b are two different colours.

For each pixel a descriptor $p_i$ is defined:

$$p_i = \begin{pmatrix} W_1 * L_c \\ W_2 * a_c \\ W_2 * b_c \\ W_3 * (L_1 - L_c) \\ \ldots \\ \ldots \\ W_3 * (L_8 - L_c) \end{pmatrix}$$

where $(L_1-L_c), \ldots, (L_8-L_c)$ are the intensity differences between the current pixel and the 8 surrounding pixels in a 3×3 neighbourhood. The vector elements are weighted using $W_1=0.5$, $W_2=1$ and $W_3=0.5$. A K-means algorithm is run on all these descriptors to extract 23 cluster centres, which are referred to as textons. Each pixel in the image is then classified as belonging to a texton by finding the nearest texton in Euclidian space. The number 23 of the cluster centres is chosen arbitrarily as a compromise between quality and speed of calculation.

As mentioned above the upper and lower half of the image of FIG. 1b are analysed separately. As an example the present explanation refers to the analysis of the lower part of the image.

Texture information is provided in a training or learning step as follows: The pixels of the image of (the lower part of) FIG. 1b (the training image) are grouped in two groups, namely "swath" and "no swath", respectively, "swath" being a group comprising pixels, which according to the outlines 24 provided by means of the 3D image depict the crop sting 12, and "no swath" being a group comprising pixels, which according to the outlines 24 provided by means of the 3D image depict the field beside the crop string 12 outside its outlines 24.

Figure 5A:
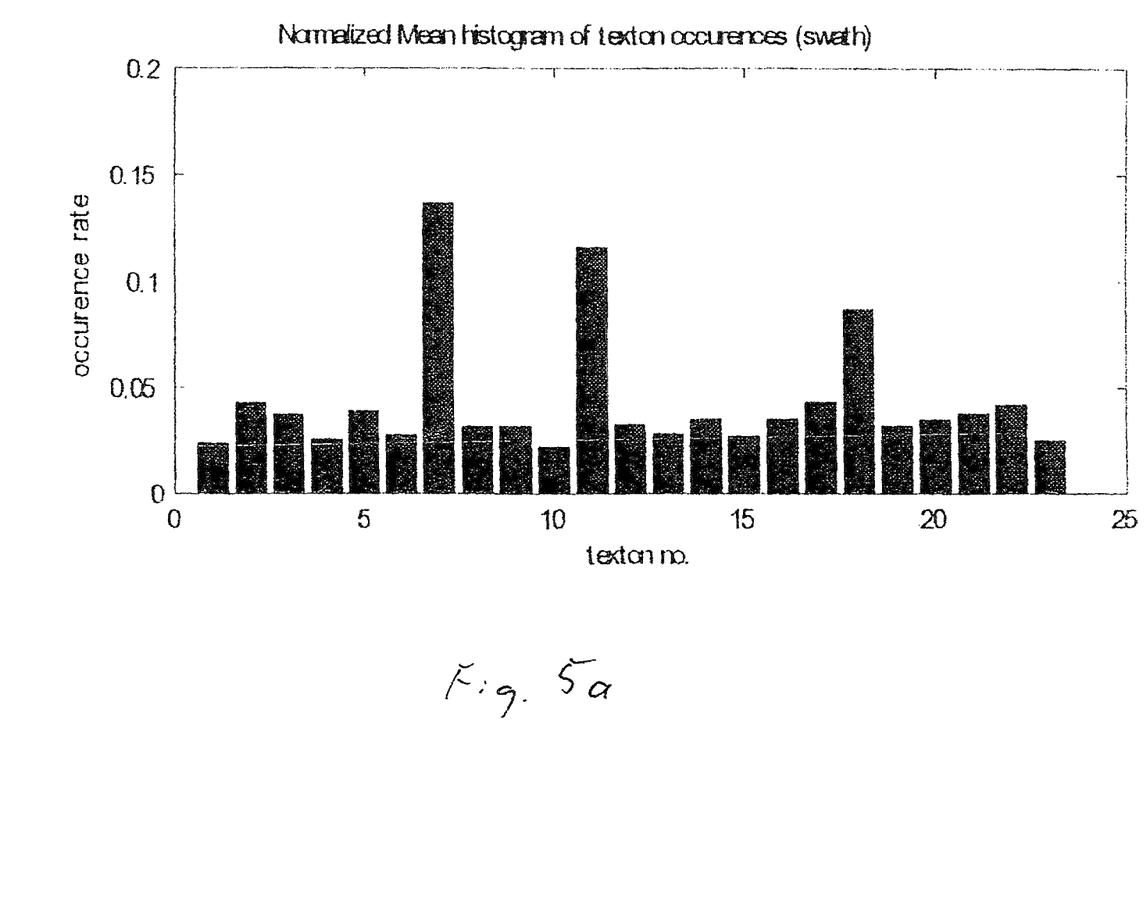
Figure 5B:
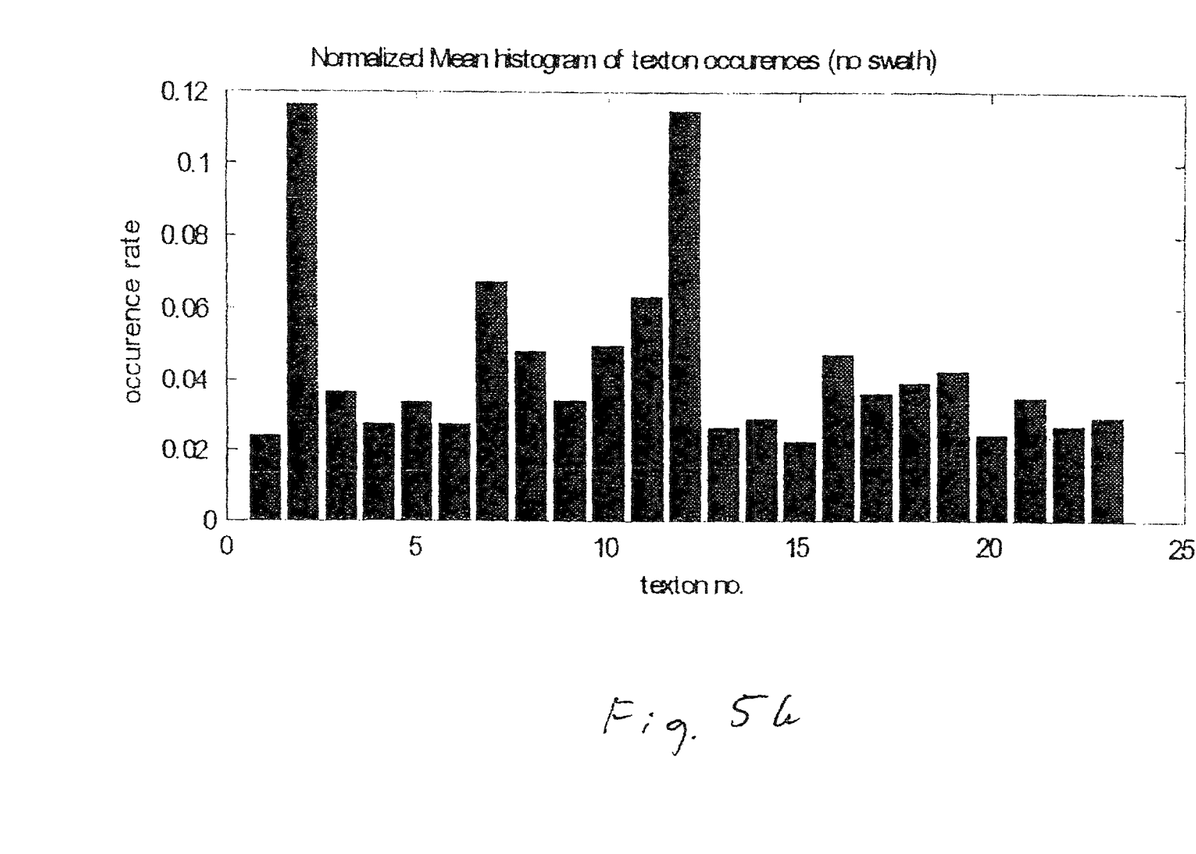

Normalized average histograms or mean histograms of texton occurrences in 32×32 pixels image patches for the "swath" and the "no swath" case are constructed for each pixel location. These are illustrated in FIG. 5a and FIG. 5b, respectively. The histograms are clearly different in the two cases, e.g. texton #2 occurs a lot for the "swath" case and little for the "no swath" case.

As a simplification covariances of the histograms are modelled individually as Gaussian for the two cases.

These histograms thus constitute texture information obtained by the learning or training step.

To detect a structure, such as a swath, in a field steps may be performed as follows:

Given an image of a field like the image of FIG. 2a it is to be evaluated whether respective areas 31 or image patches depicts a crop string/"swath" or the field beside the crop string/"no swath".

Two hypothesis are constructed for test:

$H_0: x[n]=s_0[n]+w_0[n]\ n=0,1,\ldots,N-1$ $H_1: x[n]=s_1[n]+w_1[n]\ n=0,1,\ldots,N-1$ $H_0$ being the hypothesis of "swath", and $H_1$ being the hypothesis of "no swath". N is the number of textons or cluster centres, i.e. 23 in the present embodiment. $x[n]$ is the texton histogram of the respective area 31. $s_0[n]$, $s_1[n]$ are the mean texton histograms for the two hypotheses. $w_0[n]$, $w_1[n]$ are WGN (White Gausian Noize) taken from $N(0, C_0)$ and $N(0, C_1)$, i.e. the normal or Gaussian distribution around mean=0 with covariances $C_0$ and $C_1$, respectively. $s_0[n]$, $w_0[n]$, $s_1[n]$, $w_1[n]$ are assumed known and calculated from the training image.

The two hypotheses are tested against each other using a Likelihood ratio test (LRT).

Probability density functions (PDF's) are conditioned on $H_0$ and $H_1$ as:

$$p(x; H_1) = \frac{1}{(2\pi)^{N/2}\det^{\frac{1}{2}}(C_1)}\exp\left[-\frac{1}{2}(x-s_1)^T C_1^{-1}(x-s_1)\right]$$

$$p(x; H_0) = \frac{1}{(2\pi)^{N/2}\det^{\frac{1}{2}}(C_0)}\exp\left[-\frac{1}{2}(x-s_0)^T C_0^{-1}(x-s_0)\right]$$

It is noted that $p(x; H_0)$ is a probability-value reflecting the likelihood that the respective area or image patch relates to the swath, and $p(x; H_1)$ is a probability-value reflecting the likelihood that the respective area or image patch relates to a structure different from the swath, i.e. the field adjacent the swath.

Thus LRT becomes:

$$\frac{p(x; H_1)}{p(x; H_0)} = \frac{\frac{1}{(2\pi)^{N/2}\det^{\frac{1}{2}}(C_1)}\exp\left[-\frac{1}{2}(x-s_1)^T C_1^{-1}(x-s_1)\right]}{\frac{1}{(2\pi)^{N/2}\det^{\frac{1}{2}}(C_0)}\exp\left[-\frac{1}{2}(x-s_0)^T C_0^{-1}(x-s_0)\right]} > \gamma$$

Taking logarithm on both sides yields:

$$\ln\left(\frac{\frac{1}{(2\pi)^{N/2}\det^{\frac{1}{2}}(C_1)}\exp\left[-\frac{1}{2}(x-s_1)^T C_1^{-1}(x-s_1)\right]}{\frac{1}{(2\pi)^{N/2}\det^{\frac{1}{2}}(C_0)}\exp\left[-\frac{1}{2}(x-s_0)^T C_0^{-1}(x-s_0)\right]}\right) > \ln\gamma$$

This can be simplified yielding the LRT detector:

$T(x) = 2x^T C_1^{-1} s_1 - x^T C_1^{-1} x - 2x^T C_0^{-1} s_0 + x^T C_0^{-1} x > \gamma'$ $\gamma' = 2\ln\gamma - K$ Where the constant K is:

$$K = 2\ln\left(\sqrt{\frac{\det(C_0)}{\det(C_1)}}\right) - s_1^T C_1^{-1} s_1 + s_0^T C_0^{-1} s_0$$

$\gamma'$ is a user-defined threshold that can be used to determine whether we say $H_0$ or $H_1$. Instead of binarising the image using the output of the test, the raw values are used:

$T'(x) = 2x^T C_1^{-1} s_1 - x^T C_1^{-1} x - 2x^T C_0^{-1} s_0 + x^T C_0^{-1} x$

T'(x) thus reflects the ratio between the likelihood of the respective area 31 relating to the swath and the likelihood of the respective area 31 not relating to the swath.

Using geometric information about possible widths, positions, and attitudes of the crop string 12' or swath in the image it is possible to find the Maximum Likelihood Estimate (MLE) of these parameters of the swath in the image. For this purpose it is assumed that the width d of the crop string 12' is constant and known from the training image (FIG. 1b). The position and attitude of the swath is assumed to have the swath centre line 33 inside the image with the attitude Θ of +/−π/4 rad relative to the camera direction projected down on an estimate of the ground plane based on the camera mounting location i.e. relative to the centre line 34 of the tractor 2.

First the input image (FIG. 2a) is classified using the LRT without applying a threshold. A mask can then be constructed for all feasible swath parameterisations. In the present embodiment outlines 32 of the swath or crop string 12' having a mutual distance d (the width of the swath) is used as a mask. Then the MLE is formulated as the location, which has the highest average LRT score inside the mask. This can be formulated as:

$$J = \max\left(\frac{1}{n}\sum_{i=1}^{n} T'(x_i)\right)$$

-continued $$\{x_1, \ldots, x_n\} = M(k)$$

Given that $\{x_1, \ldots, X_n\}$ are the 32×32 texton histograms that are believed to lie on the swath given by the function M applied to the mask k, we then seek the mask that maximizes the average LRT score J, thereby establishing the most possible position and attitude of the swath centre line 33.

Given that a suitable mask $k_{max}$ has been found that has maximized J, a test is set up to identify whether there is a swath in the image. An approach would be to threshold directly on the value of J. Instead the present inventors have formulated a looser criteria that thresholds on the ratio $\gamma''$ of the mean LRT score of $\{x_1, \ldots, X_n\}$ for $k_{max}$ versus the average of $X\setminus\{x_1, \ldots, X_n\}$ where X are all classified pixels in the image:

$$\frac{\frac{1}{n}\sum_{i=1}^{n} T'(x_i)}{\frac{1}{m}\sum_{j=b}^{m} T'(x_b)} > \gamma''$$

$$\{x_1, \ldots, x_n\} = M(k_{max})$$

$$\{x_b, \ldots, x_m\} = X \setminus M(k_{max})$$

We denote this criteria the quality ratio.

The quality ratio may be used for evaluating the reliability of the output of the texture analysis, which often is referred to as a signal of a texture sensor. When using more navigation sensors the reliabilities of the sensors are used for selecting a strategy for the use of the sensor outputs.

It will be understood that each of the elements described above, or two or more together, may also find a useful application in other types of methods and constructions differing from the types described above.

While the invention has been illustrated and described as embodied in a method of detecting a structure in a field, a method of steering an agricultural vehicle and an agricultural vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of steering an agricultural vehicle or implement, comprising the steps of:
    providing an image of a field that includes a specific structure;
    analysing the image of the field to obtain texture information,
    wherein at least during a learning or training step, the image of the field is divided at least in an upper part and a lower part, wherein the upper part is further away from the agricultural vehicle in a direction of travel than the lower part, wherein for the upper part, texture information of respective areas is obtained while the areas are in the upper part of the image and, from a subsequent image captured at a time when the agricultural vehicle or implement has advanced a distance corresponding to the height of the lower half of the image, the areas belonging to the specific structure and the areas belonging to the field beside the specific structure are determined;
    assigning to a plurality of areas of the image probability-values reflecting a likelihood that a respective area relates to the specific structure;
    assuming at least one geometric property of the specific structure; and
    establishing a most possible position parameter of the specific structure taking into account the probability-values and the assumed geometric property.

2. A method of detecting a structure in a field as defined in claim 1, further comprising selecting the at least one geometric property from the group consisting of a borderline, a centreline, a width, a position and an attitude.

3. A method of detecting a structure in a field as defined in claim 1, wherein said assigning includes assigning the plurality of areas the probability-values reflecting the likelihood that the respective area relates to a structure different from the specific structure.

4. A method of detecting a structure in a field as defined in claim 1, further comprising using the probability-values which are relative values.

5. A method of detecting a structure in a field as defined in claim 1, further comprising establishing the probability-value reflecting the likelihood of the specific structure being present in the image.

6. A method of detecting a structure in a field as defined in claim 1, further comprising, prior to the analyzing the image to obtain texture information, performing a learning step to obtain information about a texture of the structure in the field and information about a texture of the field beside the structure.

7. A method of detecting a structure in a field as defined in claim 1, further comprising analyzing an upper part and a lower part of the image individually to obtain the texture information.

8. A method of steering an agricultural vehicle or implement in relation to a structure in a field, comprising the steps of:
    defining the structure by providing an image of the field,
    analysing the image of the field to obtain texture information,
    wherein at least during a learning or training step, the image of the field is divided in an upper part and a lower part that are analyzed separately, wherein the upper part is further away from the agricultural vehicle in a direction of travel than the lower part, wherein for the upper part, texture information of respective areas is obtained while the areas are in the upper part of the image and, from a subsequent image captured at a time when the agricultural vehicle or implement has advanced a distance corresponding to the height of the lower half of the image, the areas belonging to the specific structure and the areas belonging to the field beside the specific structure are determined;
    assigning to a plurality of areas of the image probability-values reflecting a likelihood that a respective area relates to the specific structure,
    assuming at least one geometric property of the specific structure,
    establishing a most possible position parameter of the specific structure taking into account the probability-values and the assumed geometric property; and providing a steering signal in accordance with the position parameter thus established.

9. A method of steering an agricultural vehicle or implement as defined in claim 8, further comprising selecting the at least one geometric property from the group consisting of a borderline, a centreline, a width, a position and an attitude.

10. A method of steering an agricultural vehicle or implement as defined in claim 8, wherein said assigning includes assigning the plurality of areas the probability-values reflecting the likelihood that a respective area relates to a structure different from the specific structure.

11. A method of steering an agricultural vehicle or implement as defined in claim 8, further comprising using the probability-values which are relative values.

12. A method of steering an agricultural vehicle or implement as defined in claim 8, further comprising establishing the probability-value reflecting the likelihood of the specific structure being present in the image, and taking the latter probability-value into account when providing the steering signal.

13. An agricultural vehicle, comprising:
a steering system providing steering signals, and
an imaging device for imaging surroundings of the vehicle and an image processing device,
wherein said steering system operates to provide by said imaging device an image of the field that includes a specific structure, to analyze the image of the field to obtain texture information, to assign to a plurality of areas of the image probability-values reflecting a likelihood that a respective area relates to the specific structure, to assume at least one geometric property of the specific structure, and establish a most possible position parameter of the specific structure taking into account the probability-values and the assumed geometric property and to provide a steering signal in accordance with the position parameter thus established,
wherein at least during a learning or training step, the image of the field is divided in an upper part and a lower part are analyzed separately wherein the upper part is further away from the agricultural vehicle in a direction of travel than the lower part, and wherein for the upper part of the image, the texture information of respective areas is obtained while the areas are in the upper part of the image and, from a subsequent image captured at a time when the agricultural vehicle or implement has advanced a distance corresponding to the height of the lower half of the image, the areas belonging to the specific structure and the areas belonging to the field beside the specific structure are determined.

14. An agricultural vehicle as defined in claim 13, wherein the steering system includes at least one additional navigation sensor and operates taking into account an output of the additional navigation sensor when providing the steering signal.

15. An agricultural vehicle as defined in claim 14, wherein the at least one additional navigation sensor is a sensor selected from the group consisting of a GPS-sensor, an optical field contour sensor, an inertial measuring unit, and an odometry sensor.

* * * * *